(12) United States Patent
Donner

(10) Patent No.: US 7,843,086 B2
(45) Date of Patent: Nov. 30, 2010

(54) POWER GRID FILTER CHOKE

(75) Inventor: Roland Donner, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 12/173,197

(22) Filed: Jul. 15, 2008

(65) Prior Publication Data

US 2009/0021083 A1    Jan. 22, 2009

(30) Foreign Application Priority Data

Jul. 19, 2007    (DE) .................... 10 2007 033 556

(51) Int. Cl.
*G05F 1/10* (2006.01)
(52) U.S. Cl. ............................................ 307/98
(58) Field of Classification Search .............. 307/98
See application file for complete search history.

(56) References Cited

U.S. PATENT DOCUMENTS 6,075,425 A * 6/2000 Gopfrich et al. ............ 333/181

\* cited by examiner

*Primary Examiner*—Robert L. Deberadinis
(74) *Attorney, Agent, or Firm*—Michael J. Striker

(57) ABSTRACT

The object of the invention is to implement a circuit arrangement, which in rated operation without resonance generates as little power loss as possible, but on suitable excitation effects a disproportionate asymmetrical damping, so that resonances and overvoltages associated with them are avoided. The object is attained by using a damping member 5a, b, c, which effects the damping in proportion to a primary circuit parameter. The advantage is the adaptive performance of a power grid filter equipped with the choke of the invention.

10 Claims, 6 Drawing Sheets

POWER GRID FILTER CHOKE

CROSS-REFERENCE TO A RELATED APPLICATION

The invention described and claimed hereinbelow is also described in German Patent Application DE 10 2007 033 556.5 filed on Jul. 19, 2007. This German Patent Application, subject matter of which is incorporated herein by reference, provides the basis for a claim of priority of invention under 35 U.S.C. 119(a)-(d).

BACKGROUND OF THE INVENTION

The invention relates to a power grid filter choke as defined by the independent claim. Such chokes are used in the operation of such power electronics devices as switched-mode power supplies, servo drives, and UPSs.

A power grid filter limits interfering factors that are caused by electronic devices and that affect the public power supply grid (radio interference suppression). A power grid filter also improves the electromagnetic compatibility of electrical devices and thus increases the immunity to interference. There is accordingly a need for power grid filters with chokes in accordance with the invention, in order to meet the relevant electromagnetic compatibility specifications.

A common feature of these power grid filters is that they have capacitances in the range of a few microrfarads (phase measured against protective conductor), which are meant to keep asymmetrical interference away from the phase voltage of the power grid. These capacitances, together with the grid impedance, form a more or less damped oscillating circuit, which can come into resonance in the presence of suitable excitation.

The consequence is high leakage currents at the filter input as well as considerable phase-to-ground voltages with a corresponding frequency, which can be superimposed on the normal grid voltage and lead to the destruction of the components. The sources of these excitations are extremely various.

They can be the power electronics connected to the power grid filter, the pulse frequencies of which electronics and the associated harmonics typically extend up to several tens of a kilohertz, or even harmonics that are a multiple of the grid frequency and can be caused by completely different consumers that are connected to some other point of the grid. The spectrum of these excitations thus extends from a few hundred hertz as far as several tens of a kilohertz.

The impedance of a power supply grid is composed of a complex system, comprising infeed nodes, lines, transformers, and so forth, which essentially assure an inductive component, but also comprise the entirety of the consumers that are connected at a particular time. If ohmic consumers predominate, then the grid is well damped, and the risk of resonances is less. Each additional load reduces the effective grid impedance. Inductive components of the impedance are determined essentially by the stray reactances of transformers and by the line lengths (distance from infeed points), but also by inductive consumers, such as rotary-current motors. In very extensive grids, as for instance in North America and China, the inductive components are as a rule higher than in Europe. Hence the impedance of a grid cannot be predicted. It depends on the switching state and the particular load situation and therefore also varies over time.

Taking what has been said above into account, it becomes clear that there is a relatively high risk of resonances which nevertheless is difficult to predict. Even if the grid is stable and relatively well damped, resonances can occur if a power electronics consumer together with a capacitive load is operated on a relatively long, low-loss supply line, or in other words one that has a sufficiently large cross section. If a large power electronics system with many power grid filters is involved, such as a drive system for a printing press, then 20-30 m of lead line are already sufficient to shift the resonant frequency into a critical range.

Dictated by the pulsed operation that is established in power electronics, the parasitic capacitances to ground that are present in every system (for Instance conductor to shield In shield of motor lines), leakage currents occur, which to a large extent flow back via the capacitors present in the power grid filters (phase-ground) and thus represent the greatest proportion of the excitations. This is accordingly an asymmetrical excitation. In principle, a symmetrical excitation (that is, phase-phase) is also conceivable, but the likelihood of resonance in that case is substantially less, since the consumers downstream of the power grid filter typically provide for adequate symmetrical damping.

In order to provide for an asymmetrical damping, some power grid filter manufacturers connect low-impedance resistors parallel to the capacitors, but even in rated operation this leads to a corresponding power loss. Nor is it assured that the damping in the presence of relatively great excitation will still suffice to suppress resonances. Inserting resistors into the lead line is precluded, because of the enormous power loss that would cause.

German Published Utility Model DE 295 06 951 U1 shows the construction of a power grid filter with a damping transformer in the form of a choke for power grid filters, with a primary winding for connecting the choke to the grid phases L1 through L3, and with a secondary winding with a secondary circuit; the primary winding and the secondary winding are located on a winding core, and the secondary circuit includes a damping member in the form of an ohmic load that by means of the choke effects damping in the primary circuit. The ohmic load is transformed into the primary circuit by the transformational action of the arrangement and damps the primary circuit permanently.

The disadvantage of this arrangement is on the one hand this permanent damping of the primary circuit, and on the other the use of ferrite as the material for the coil core of the choke. Ferrite has the disadvantage that the permeability is highly temperature-dependent, and the saturation induction amounts to only approximately 400 mT. The Curie temperatures are also so low that they can easily be reached when used for a damping choke, where high losses are intentionally meant to occur as needed.

Ferrite ring cores can furthermore be manufactured economically only up to a certain size, since the danger of breakage during production rises sharply with increasing size, leading to a low yield and correspondingly high prices. Moreover, a possible overload cannot be detected. With the choke known from the prior art, only the cable-based interference caused by the power electronics is meant to be reduced, specifically because the resonance points are shifted to a lower frequency range that is not relevant for the electromagnetic compatibility consideration.

SUMMARY OF THE INVENTION

The object of the invention is to implement a circuit arrangement which in rated operation generates as little power loss as possible and effects a disproportionate asymmetrical damping, so that resonances in which the grid impedance is involved, and attendant overvoltages, are avoided.

The invention attains this object by means of a choke as defined by the preamble to the independent claim; the damping member includes means which accomplish the damping in proportion to a primary circuit parameter, and the primary circuit parameter is in particular the primary circuit voltage or the primary circuit current or the primary circuit frequency. This prevents the permanent creation of power loss, and the damping can be done adaptively and as a function of the primary circuit parameters. The damping is therefore adapted dynamically to the given local and changing conditions and, in contrast to the prior art discussed above, is not statically and permanently burdened by loss. This advantage is attained among other ways by providing that the means are embodied such that they effect a damping intensity that is dependent proportionately to the intensity of the primary circuit parameter that is definitive for the damping.

Preferably, the means effect the damping intensity in proportion to the magnetic saturation of the material comprising the winding core, in order to avoid oversaturation.

Especially preferably, the winding core includes ferrosilicon and in particular is implemented by means of sheets of grain-oriented material of the aforementioned kind. This core is connected upstream of the power grid filter and operated such that in rated operation, it is only slightly saturated without excitation, for example at values of around 150 mT. As shown in FIG. 3, the core losses in this saturation are still very slight. With increasing saturation and increasing frequency, the losses increase and thus assure suitable damping of these frequency components.

Annular strip cores of sheet SiFe can be inexpensively produced as a common winding core with arbitrary dimensions, so that they are also available for applications involving high currents, where large line cross sections are required. The core material furthermore has a high saturation range (up to 2 teslas), and the Curie temperature is above 600° C. In this usage, the higher core losses compared to ferrite are desired and even necessary.

Very particularly preferably, the damping member is embodied such that it affects one or both half-waves of of the primary circuit voltage or the primary circuit current preferably as a function of the status of the primary circuit. The intensity can thus be additionally increased or lessened.

Advantageously, the damping member includes a switch means, which is embodied such that it controls the time or intensity of the damping, preferably as a function of the status of the primary circuit. The invention is thus adaptable worldwide for many grids.

For the advantageous application of the invention in a three-phase power supply or grid, two primary windings for connection to a three-phase grid are provided for the primary circuit, a fourth winding is provided for the secondary circuit, and the primary windings and secondary winding are located on a common winding core. Two- or four-phase grids can also be considered.

To increase safety, a switch means is provided and surrounded by the choke, which switch means is located such that the primary circuit is disconnectable from the power grid in proportion to a primary circuit parameter. If the selectable damping proves no longer to suffice for the varying primary circuit parameters, then the grid can be shut down, to prevent malfunctions at the connected periphery. For instance, a thermostatic switch can be provided; upon an overload, which makes itself felt by the exceeding of certain temperatures at the load resistor, this switch opens, and thus generates a signal that can be used for instance for shutting down the system.

The choke is preferably used in a power grid filter. The power grid filter is preferably a component of an electrical apparatus, in particular of an electrical drive mechanism.

Further advantageous features of the invention will become apparent from the exemplary embodiment described hereinafter.

DESCRIPTION OF THE PREFERRED EMBODIMENTS

Figure 1:
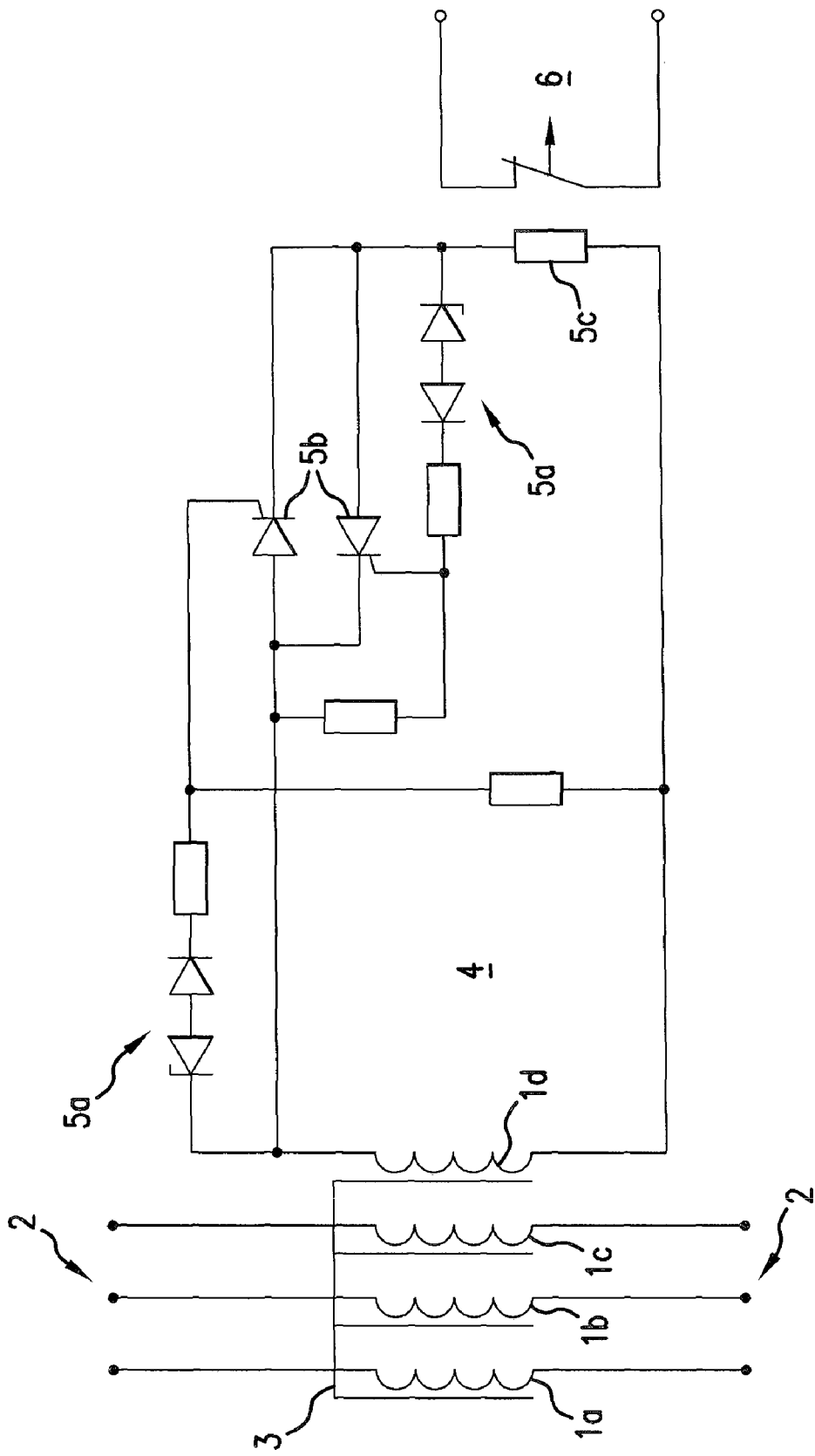
FIG. 1 is a detail of a three phase power grid filter.

FIG. 1 shows a detail of a three-phase power grid filter with a power grid choke according to the invention. It is understood that the fundamental concept can be used for power grid filters with an arbitrary number of phases.

Shown in detail are the primary winding 1a, b, c of the choke for connecting the choke to the primary circuit 2 and the secondary winding 1d with a secondary circuit 4; the primary winding 1a, b, c and secondary winding 1d are connected to a common winding core 3 of grain-oriented sheet SiFe, and the secondary circuit 4 includes a damping member 5a, b, c, which is suitable by means of the choke for effecting damping in the primary circuit 2. As its essential components, the damping member includes voltage level detectors 5a for the primary circuit voltage and electrically triggerable switch means 5b and an ohmic consumer 5c as the load. In the immediate vicinity of the load, there is a thermostatic switch 6, which can respond to voltage or current peaks in the primary circuit indirectly based on the temperature of the load resistor 5c. The other components serve to dimension the circuit and adjust the operating point. Accordingly, the means 5a, b, c can effect the damping in proportion to a primary circuit parameter.

If the excitation and hence the leakage current increase, then the voltage induced in the winding 1d increases as well. If it attains a certain level, which is determined by the Zener diodes 5a, then the thyristors 5b fire, and the load resistor 5c is applied to the winding 1d and as a result the load resistor is coupled in transformer fashion to the primary side 2 and thus assures damping. It is entirely appropriate to select different voltages for the two Zener diodes 5a, so that only one thyristor initially fires and hence initially only one half-wave becomes operative. Not until the voltage at the winding 1d rises further is the second thyristor fired by means of the second Zener diode, so that the second half-wave is taken into account as well. It is thus possible to damp the half-waves selectively and as a function of the primary circuit.

Figure 4:
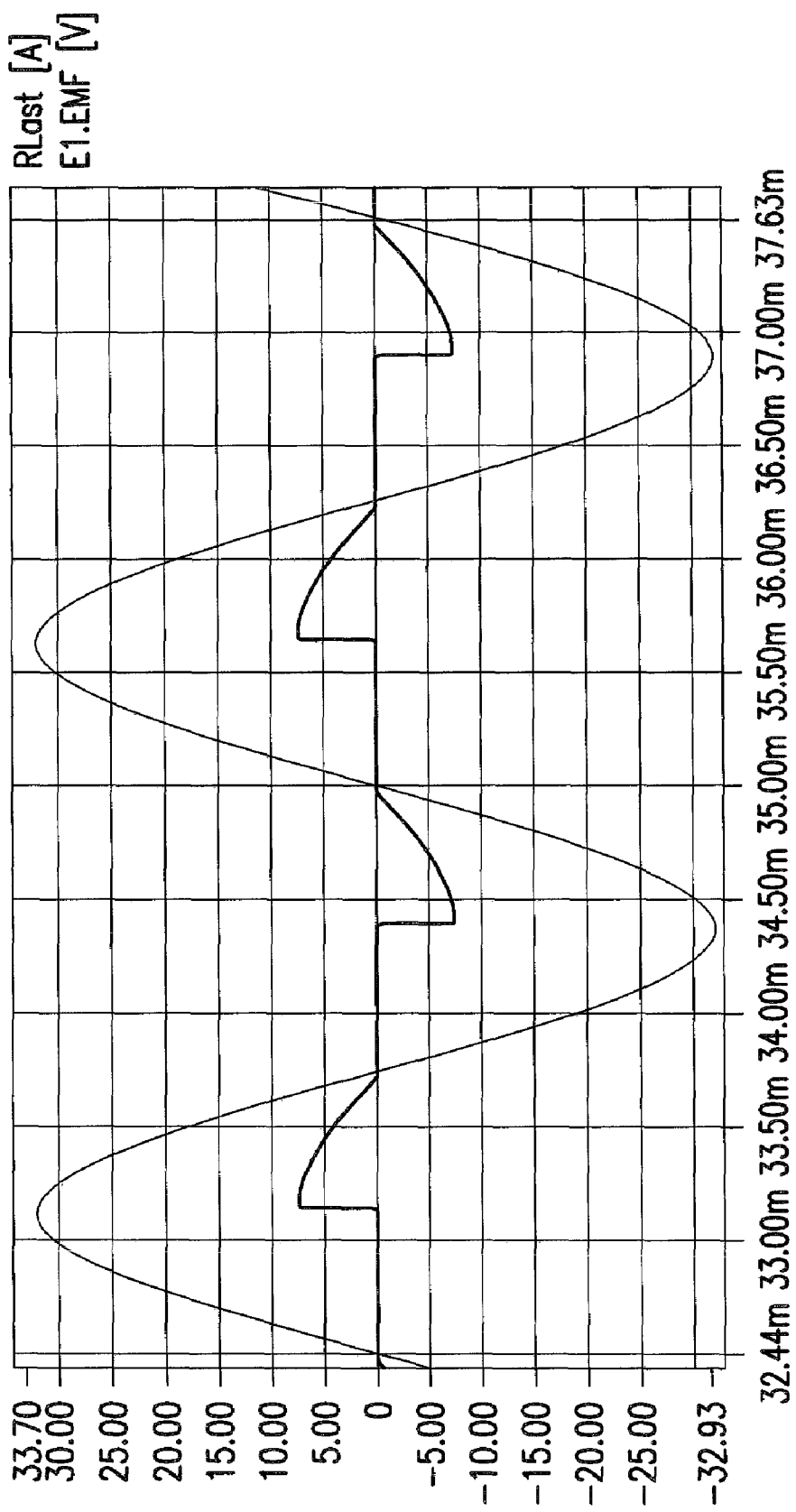
FIG. 4 displays a phase segment or firing angle of approximately 90 degrees.

With increasing excitation after the firing of the thyristors, the intensity of the damping increases further continuously. This is effected by means of the fixed activation thresholds that are predetermined by the Zener diodes. If the voltage at the winding 1d has reached a value that is just high enough to cause the thyristors to fire, then a phase segment or firing angle of approximately 90° ensues. This is shown clearly in FIG. 4.

Figure 5:
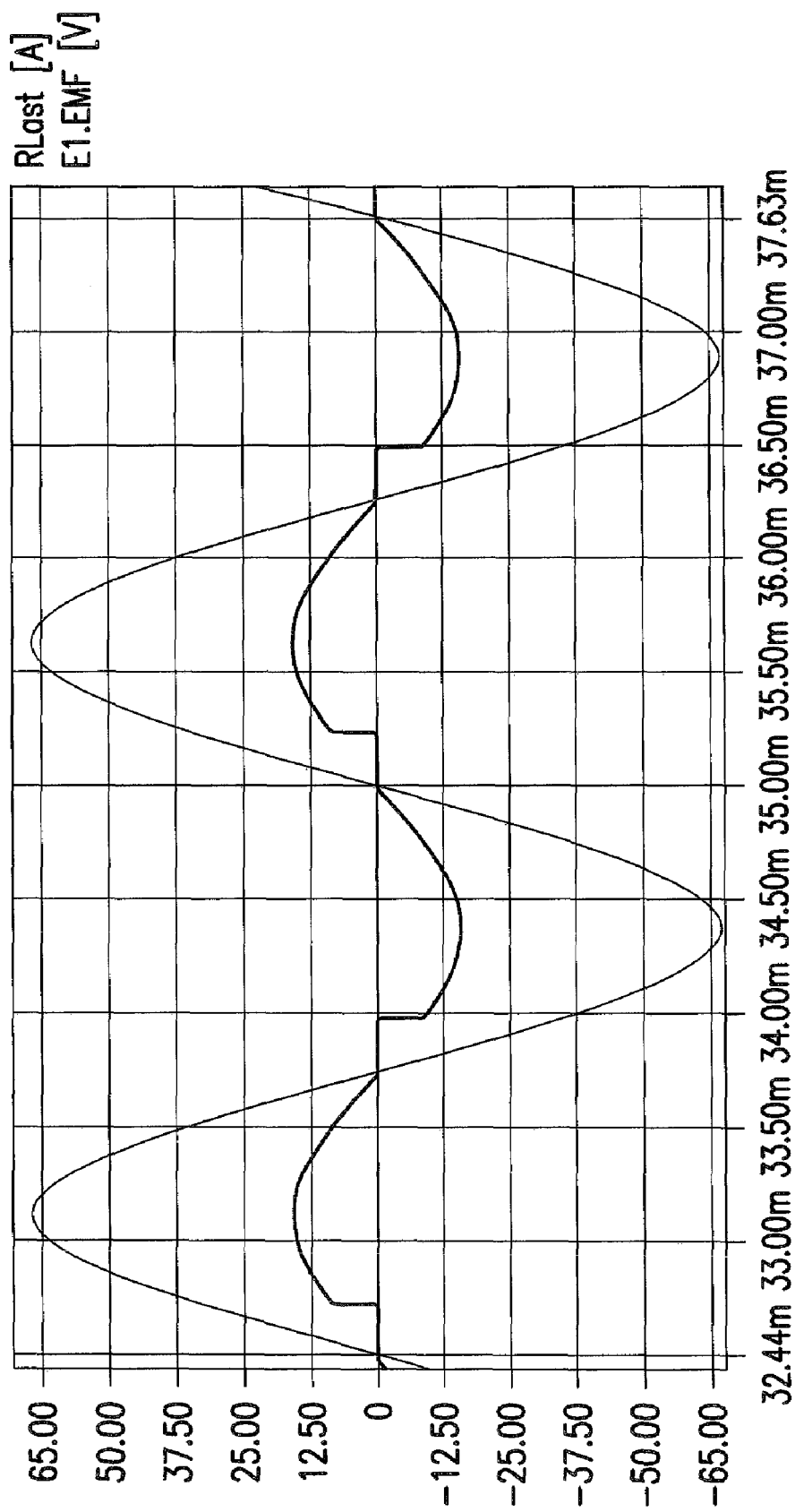
FIG. 5 displays the effect of the ohmic component coupled to the primary side.

If the peak voltage at the winding 1*d* is for instance doubled from approximately 30 volts to 60 volts, a smaller firing angle remains, and as a result the effect of the ohmic component coupled to the primary side is enhanced; see FIG. 5.

Within the scope of the invention, the firing threshold for the thyristors is set to such a level that saturation of the annular strip core is avoided, and the core thus remains constantly magnetically operative. Because of the high saturation induction of the core material provided, a broad saturation range before the thyristor actuator has to become active is the result.

Here, the load resistor 5*c* includes the thermostatic switch 6. If a high excitation occurs over a relatively long period of time, which could lead to an overload on the resistor 5*c* or other system parts, then this switch 6 opens and thus furnishes a signal with which the system can be shut down and disconnected from the grid in a regulated way, before damage occurs to the system or its periphery.

Figure 6:
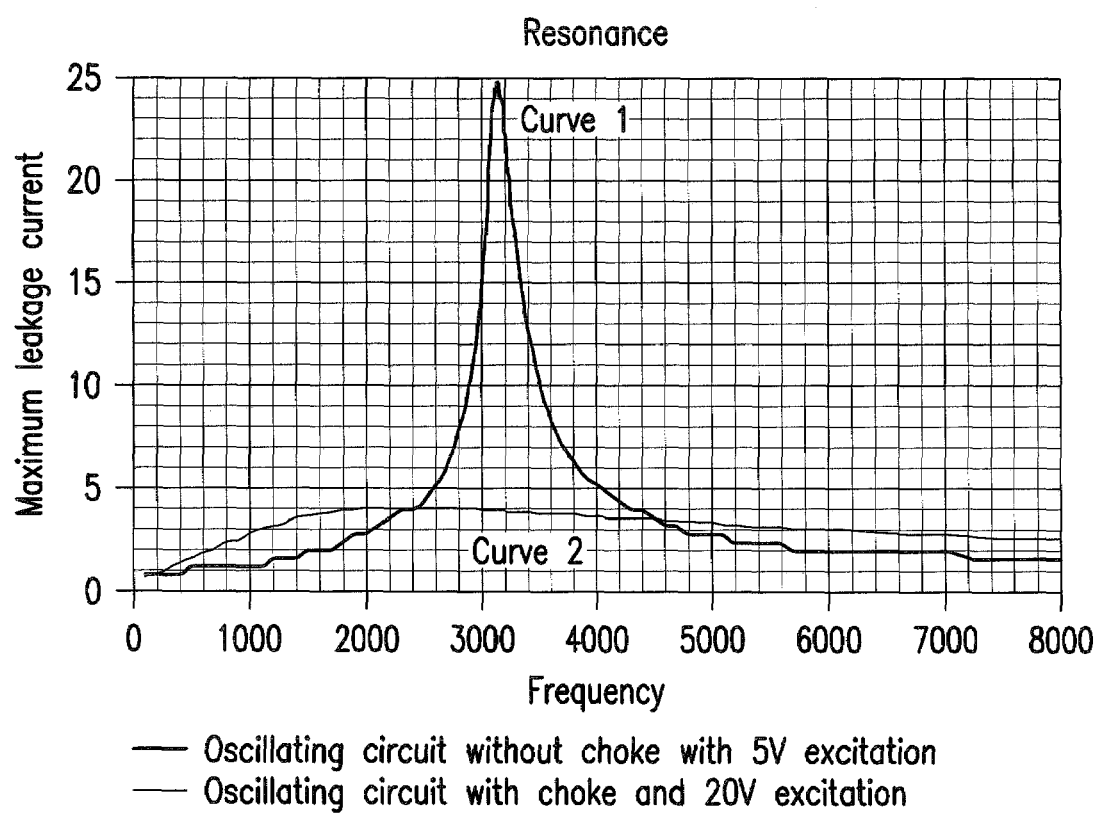
FIG. 6 shows the conditions that have been measured at a grid connection of an actual system with a power grid.

FIG. 6 shows the conditions that have been measured at a grid connection of an actual system with a power grid filter. With the choke of the invention, even if the excitation is four times greater, no significantly excessive resonance can be ascertained any longer (curve 2), compared to a version without the circuit according to the invention (curve 1 with a resonant frequency of around 3000 Hz). Curve 1 (without the choke) occurred upon an excitation with 5 volts, while curve 2 (with the choke) occurred upon an excitation with 20 volts.

Figure 2:
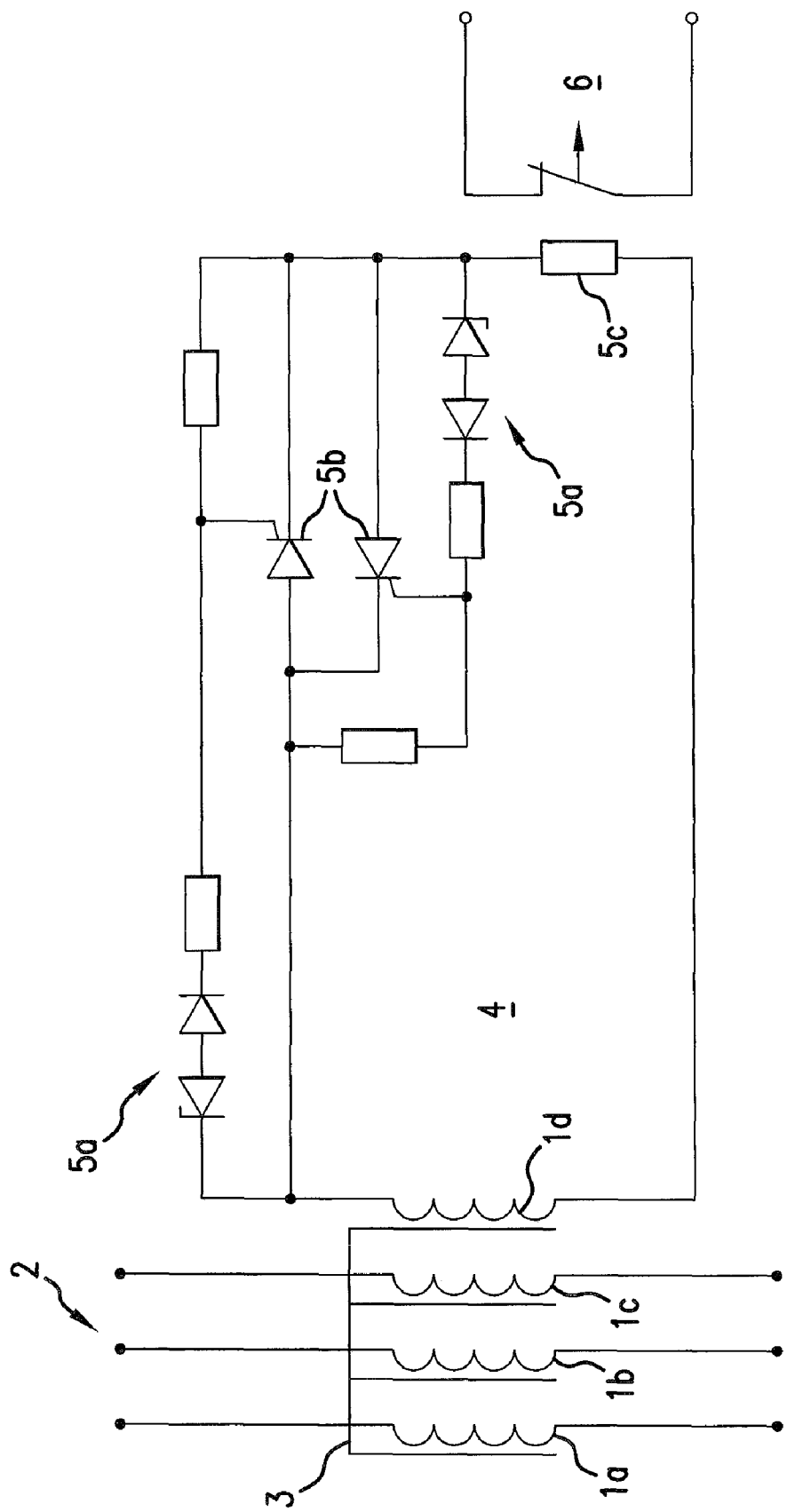
FIG. 2 is an alternative version of the circuit of FIG. 1.
Figure 3:
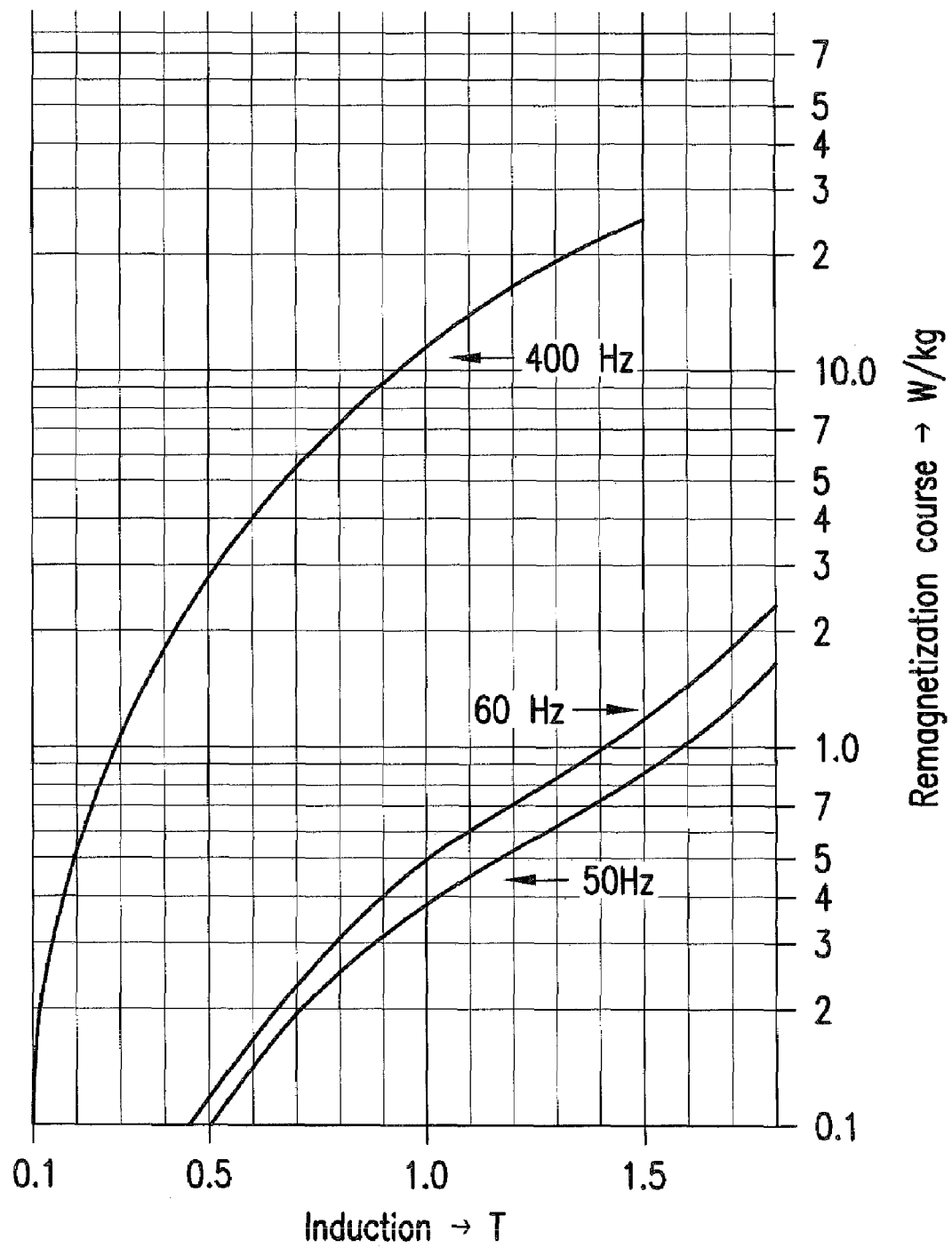
FIG. 3 is an induction graph.

FIG. 2 shows an alternative version of the circuit of FIG. 1, with a comparable effect. Reference numerals identical to FIG. 1 have an identical meaning. This version, compared to the version shown in FIG. 1, has the advantage that at the gate resistor of the thyristor in the upper branch, independently of the output voltage at the winding 1*d*, only a limited power loss occurs, since the voltage drop at the load resistor 5*c* is hardly perceptible any longer at the gate. The gate resistor of the thyristor in the branch below is already connected in the same way, and hence the circuit is now constructed symmetrically. However, the basic function is extremely extensively identical in both circuit variants (FIGS. 1 and 2).

The invention claimed is:

1. A choke for power grid filters, having a primary winding (1*a, b, c*) for connecting the choke to a primary circuit (2) and a secondary winding (1*d*) with a secondary circuit (4), in which the primary winding (1*a, b, c*) and secondary winding (1*d*) are located on a winding core (3) and the secondary circuit (4) includes a damping member (5*a, b, c*), which effect the damping in the primary circuit (2) by means of the choke, wherein the damping member (5*a, b, c*) includes means which accomplish the damping in proportion to a primary circuit parameter, and the primary circuit parameter is in particular the primary circuit voltage or the primary circuit current or the primary circuit frequency.

2. The choke as defined by claim 1, wherein the means (5*a, b, c*) are embodied such that they effect a damping intensity that is dependent proportionately to the intensity of the primary circuit parameter that is definitive for the damping.

3. The choke as defined by claim 1, wherein the means (5*a, c*) effect the damping intensity in proportion to the magnetic saturation of the material comprising the winding core (3).

4. The choke as defined by claim 1, wherein the winding core (3) includes ferrosilicon and in particular is implemented by means of sheets of grain-oriented ferrosilicon.

5. The choke as defined by claim 1, wherein the damping member (5*a, b, c*) is embodied such that it effects an influence one or both half-waves of the primary circuit voltage or the primary circuit current.

6. The choke as defined by claim 1, wherein the damping member (5*a, b, c*) includes a switch means (5*b*), which is embodied such that it controls the time or intensity of the damping.

7. The choke as defined by claim 1, wherein for the primary circuit (2), two primary windings (1*a, b, c*) for connection to a three-phase power supply or grid (2) are provided, and for the secondary circuit (4), a fourth winding (1*d*) is provided, and the primary windings (1*a, b, c*) and secondary winding (1*d*) are located on a common winding core (3).

8. The choke as defined by claim 1, wherein a switch means (6) is surrounded by the choke and is located such that the primary circuit (2) is disconnectable from the power grid in proportion to a primary circuit parameter.

9. A power grid filter with a choke as defined by claim 1.

10. An electrical apparatus, in particular an electrical drive mechanism, comprising:

a power grid filter, said power grid filter having a choke, said choke having a primary winding (1*a, b, c*) for connecting the choke to a primary circuit (2) and a secondary winding (1*d*) with a secondary circuit (4), in which the primary winding (1*a, b, c*) and secondary winding (1*d*) are located on a winding core (3) and the secondary circuit (4) includes a damping member (5*a, b, c*), which effect the damping in the primary circuit (2) by means of the choke, wherein the damping member (5*a, b, c*) includes means which accomplish the damping in proportion to a primary circuit parameter, and the primary circuit parameter is in particular the primary circuit voltage or the primary circuit current or the primary circuit frequency.

* * * * *